United States Patent
Singh et al.

(10) Patent No.: US 8,391,870 B1
(45) Date of Patent: Mar. 5, 2013

(54) WIRELESS HANDOFFS BASED UPON PAST HANDOFF METRICS

(75) Inventors: Jasinder Pal Singh, Olathe, KS (US); Maulik K. Shah, Overland Park, KS (US); Siddharth S. Oroskar, Overland Park, KS (US); Bhagwan Singh Khanka, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 405 days.

(21) Appl. No.: 12/783,684

(22) Filed: May 20, 2010

(51) Int. Cl.
  *H04W 36/00* (2009.01)
(52) U.S. Cl. .................. 455/436; 455/442; 370/332
(58) Field of Classification Search .......... 455/436–442, 455/525; 370/331–333
  See application file for complete search history.

(56) References Cited

U.S. PATENT DOCUMENTS

| | | | |
|---|---|---|---|
| 5,848,063 A * | 12/1998 | Weaver et al. ................. | 370/331 |
| 5,974,318 A * | 10/1999 | Satarasinghe ................. | 455/436 |
| 6,026,301 A | 2/2000 | Satarasinghe | |
| 6,085,091 A | 7/2000 | Yoo et al. | |
| 6,112,089 A * | 8/2000 | Satarasinghe ................. | 455/437 |
| 6,192,246 B1 * | 2/2001 | Satarasinghe ................. | 455/442 |
| 6,208,860 B1 | 3/2001 | Kim et al. | |
| 6,507,741 B1 | 1/2003 | Bassirat | |
| 6,658,258 B1 * | 12/2003 | Chen et al. ................. | 455/456.1 |
| 7,139,575 B1 | 11/2006 | Chen et al. | |
| 7,245,917 B2 * | 7/2007 | Chiueh ......................... | 455/442 |
| 7,260,399 B1 * | 8/2007 | Oh et al. ....................... | 455/436 |
| 8,107,438 B1 * | 1/2012 | Singh et al. .................... | 370/332 |
| 2004/0166856 A1 * | 8/2004 | Niemenmaa .................. | 455/436 |
| 2010/0003986 A1 * | 1/2010 | Chen ............................ | 455/436 |

* cited by examiner

*Primary Examiner* — Sharad Rampuria

(57) ABSTRACT

What is disclosed is a method of operating a wireless communication system. The method includes determining a first round trip delay threshold to initiate handoff messaging, and determining round trip delay metrics for a plurality of handoffs in a wireless access sector. The method also includes processing the first round trip delay threshold and the round trip delay metrics for the wireless access sector to determine a second round trip delay threshold and wirelessly transferring the second round trip delay threshold to a wireless communication device in the wireless access sector, where the wireless communication device uses the second round trip delay threshold to initiate handoff messaging in the wireless access sector.

19 Claims, 6 Drawing Sheets

WIRELESS HANDOFFS BASED UPON PAST HANDOFF METRICS

TECHNICAL FIELD

Aspects of the disclosure are related to the field of communications, and in particular, wireless handoffs in wireless communication networks.

TECHNICAL BACKGROUND

Wireless communication systems provide wireless access to communication services for wireless communication devices. Typically, wireless communication systems include wireless access equipment, such as base stations and associated interconnection and backhaul equipment, as a part of a wireless access system to provide the wireless access over a geographic region. The wireless access equipment is distributed throughout the geographic region and provides wireless access via individual coverage areas of the geographic region.

In many examples, wireless communication devices are mobile devices, and able to be moved throughout the geographic region of a wireless communication system. As a mobile wireless communication device moves between the individual coverage areas of a wireless access system, the wireless communication device transitions from receiving wireless access in one coverage area to receiving wireless access in another coverage area. These transitions between coverage areas are typically referred to as handoffs, and associated handoff communications are used to arrange, setup, or initiate handoff messaging before an actual handoff from one coverage area to another is performed.

Overview

What is disclosed is a method of operating a wireless communication system. The method includes determining a first round trip delay threshold to initiate handoff messaging, and determining round trip delay metrics for a plurality of handoffs in a wireless access sector. The method also includes processing the first round trip delay threshold and the round trip delay metrics for the wireless access sector to determine a second round trip delay threshold and wirelessly transferring the second round trip delay threshold to a wireless communication device in the wireless access sector, where the wireless communication device uses the second round trip delay threshold to initiate handoff messaging in the wireless access sector.

What is also disclosed is a method of operating a wireless communication device. The method includes receiving wireless access from a present sector of a wireless access system and receiving a round trip delay handoff threshold for the wireless access system. The method also includes determining round trip delays and received signal strengths of wireless communications for past handoffs of the wireless communication device. The method also includes processing the round trip delays and the received signal strengths of the past handoffs to modify the round trip delay handoff threshold, and initiating handoff communications for a present handoff from the present sector to a second sector of the wireless access system based upon the modified round trip delay handoff threshold.

What is also disclosed is a wireless communication device, where the wireless communication device is receiving wireless access from a present sector of a wireless access system. The wireless communication device includes a transceiver configured to receive a round trip delay handoff threshold for the wireless access system. The wireless communication device also includes a processing system configured to determine round trip delays and received signal strengths of wireless communications for past handoffs of the wireless communication device and process the round trip delays and the received signal strengths of the past handoffs to modify the round trip delay handoff threshold. The processing system is also configured to initiate handoff communications for a present handoff from the present sector to a second sector of the wireless access system based upon the modified round trip delay handoff threshold.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
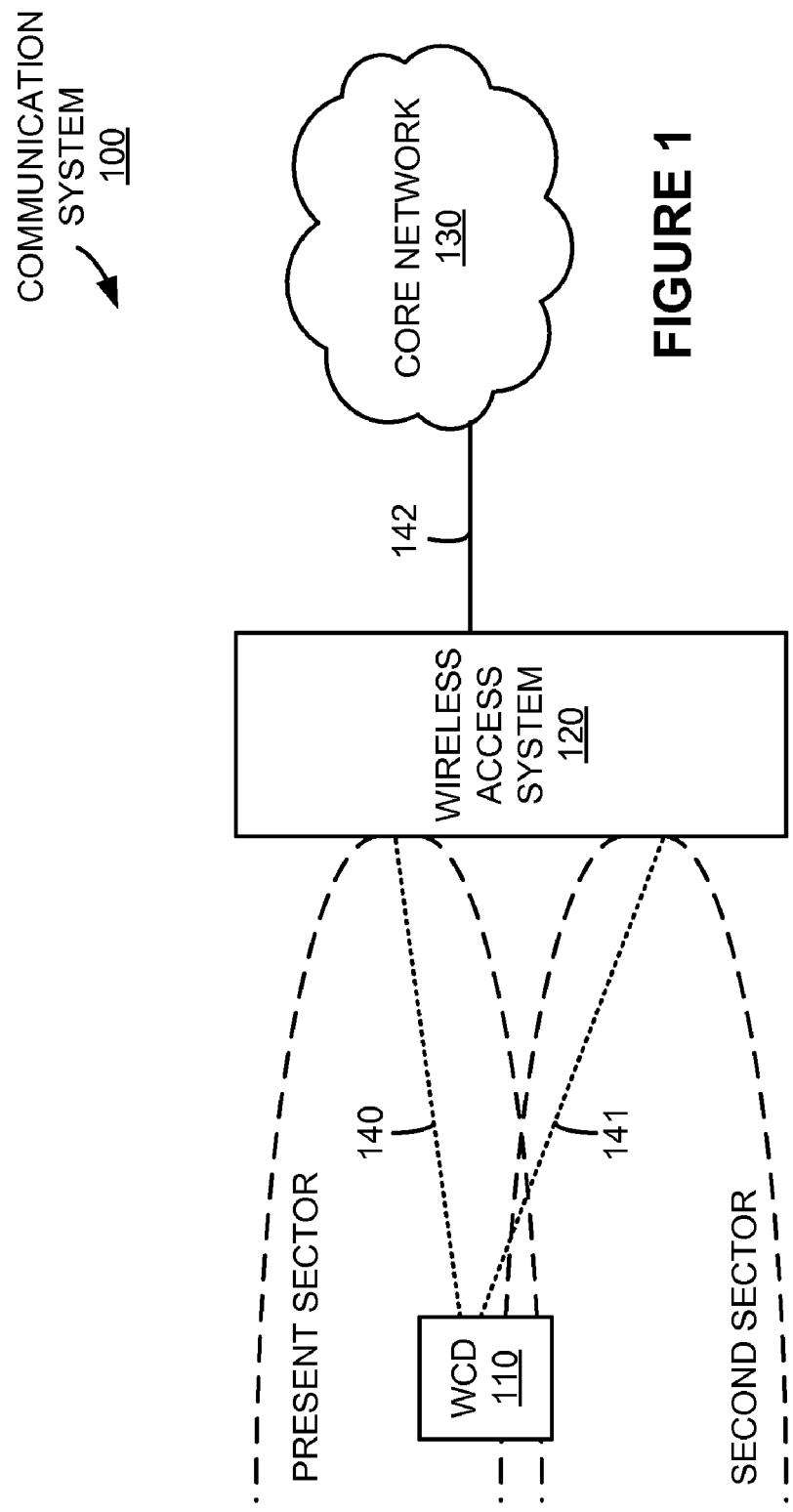
FIG. 1 is a system diagram illustrating a communication system.

FIG. 1 is a system diagram illustrating communication system 100. Communication system 100 includes wireless communication device (WCD) 110, wireless access system 120, and core network 130. Wireless communication device 110 and wireless access system 120 communicate over wireless links 140-141. Wireless access system 120 and core network communicate over link 142.

In FIG. 1, wireless access system 120 provides wireless access to communication services for wireless communication devices within different sectors. The sectors of wireless access system 120 are shown by the dotted boundaries denoting a present sector and a second sector. It should be understood that although the sector boundaries are shown as expanding from wireless access system 120, other shapes and configurations could be used to represent the individual sectors. As part of the wireless access provided by wireless access system 120, wireless communication device 110 may transition from receiving wireless access in one sector to receiving wireless access in another sector, due to motion, radio frequency (RF) conditions, or other factors. These transitions between sectors are typically referred to as handoffs, where handoff communications are used to arrange, setup, or initiate handoff messaging before an actual handoff from one sector to another is performed. As shown in FIG. 1, communication with wireless communication device 110 in a present sector of wireless access system 120 occurs over wireless link 140. Handoff messaging or other communications may occur between wireless communication device 110 and the present sector as well as the second sector. If wireless communication device 110 transitions to receiving wireless access from the second sector, then further communications would occur over wireless link 141.

Figure 2:
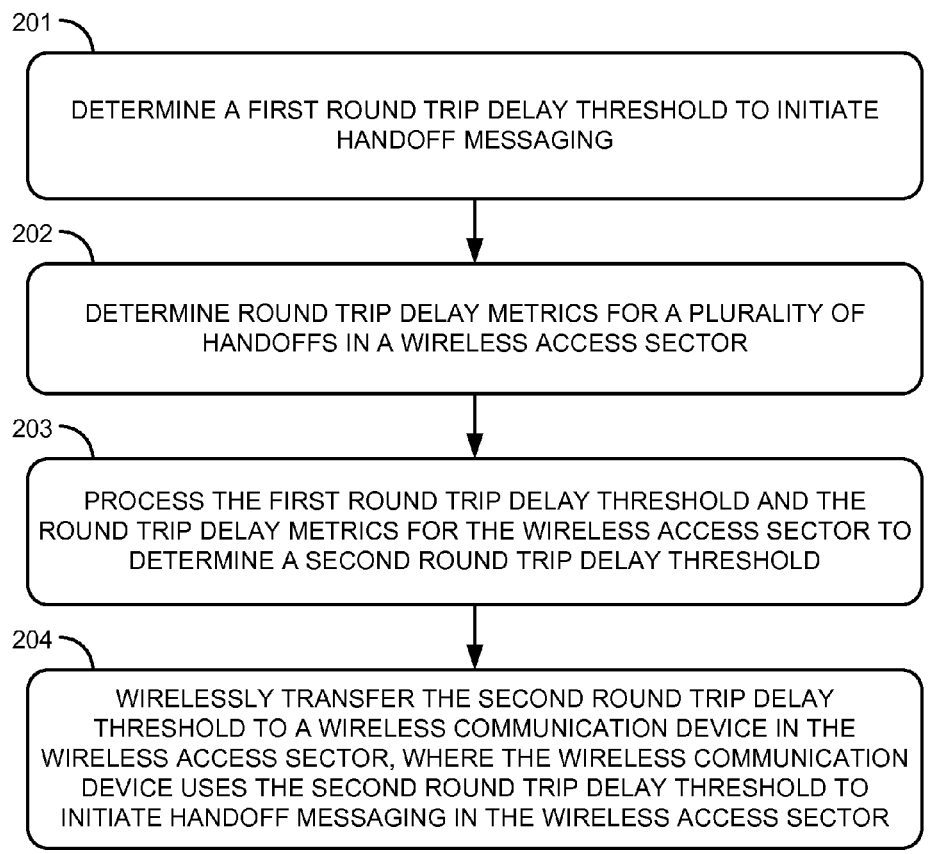
FIG. 2 is a flow diagram illustrating a method of operation of a communication system.

FIG. 2 is a flow diagram illustrating a method of operating communication system 100. The operations of FIG. 2 are referenced herein parenthetically. In FIG. 2, wireless access system 120 determines (201) a first round trip delay threshold to initiate handoff messaging. In other examples, wireless communication device 110 or other systems could determine the first round trip delay threshold. In this example, a round trip delay (RTD), or round trip time (RTT), describes the time delay experienced for a response to be received to a transmission. For example, if communications were transmitted by wireless communication device 110, a round trip delay would be the time delay for wireless communication device 110 to receive a response to the transmitted communications from wireless access system 120. In other examples, wireless access system 120 could transmit communications, awaiting a response from wireless communication device 110. When wireless communication device 110 is about to transition from one sector to another, handoff messaging is typically exchanged with wireless access system 120 before a handoff occurs. The handoff messaging, or other handoff communications, can be initiated based upon different criteria. One possible criterion is a round trip delay threshold for communications experienced by wireless communication device 110 when receiving wireless access from a present sector of wireless access system 120. In this example, wireless access system 120 determines the first round trip delay threshold to initiate the handoff messaging. The first round trip delay threshold could be a default or predetermined threshold for communication system 100.

Wireless access system 120 determines (202) round trip delay metrics for a plurality of handoffs in a wireless access sector. In this example, the plurality of handoffs include past handoffs for wireless communication devices which have received wireless access in the present sector shown in FIG. 1. The round trip delay metrics could include round trip delays, reported signal strengths, received signal strengths, RF conditions, among other metrics for handoff communications exchanged for past handoffs. Metrics for other sectors, wireless communication devices, or handoffs could also be determined. In this example, wireless access system 120 determines the metrics based upon past handoffs for the present sector shown in FIG. 1. In other examples, wireless communication device 110 or other systems could determine the metrics for past handoffs. The metrics could be stored, such as in a log or database on a computer-readable medium, for later access by wireless access system 120 or wireless communication device 110.

Wireless access system 120 processes (203) the first round trip delay threshold and the round trip delay metrics for the first wireless access sector to determine a second round trip delay threshold. In some examples, the first round trip delay threshold and the round trip delay metrics could be processed to determine a pattern of past handoffs, such as a clustering, minimum, maximum, or average of the round trip delay metrics for past handoffs. The pattern of the round trip delay metrics for past handoffs is then processed to determine the second round trip delay threshold. In other examples, wireless communication device 110 or other systems could process the first round trip delay threshold and the round trip delay metrics for the first wireless access sector to determine a second round trip delay threshold.

Wireless access system 120 transfers (204) the second round trip delay threshold to wireless communication device 110 in the first wireless access sector. Wireless communication device 110 uses the second round trip delay threshold to initiate handoff messaging in the first wireless access sector. A subsequent handoff of wireless communication device 110 could be based upon the handoff messaging. The handoff messaging typical includes communications related to the setup of a potential handoff of wireless communication device 110 from a present sector to another sector. The handoff messaging could also include information on the other sectors available for wireless communication device 110, signal strength information for the other sectors, service request information, channel assignments, routing information, or other information, to aid wireless communication device 110 and wireless access system 120 in the transition of wireless communication device 110 to another sector. In some examples, wireless communication device 110 does not experience a handoff after the handoff messaging is initiated, perhaps due to signal strength changes, motion changes, or other factors which preclude the handoff.

If wireless communication device 110 meets further criteria for an actual handoff, then wireless communication device 110 would transition from receiving wireless access in the present sector to receiving wireless access in another sector, such as the second sector illustrated in FIG. 1. The further criteria for the actual handoff could include a signal strength as detected or received by wireless communication device 110. The further criteria for the actual handoff could include a third round trip delay threshold, corresponding to a larger round trip delay than the second round trip delay threshold. The further criteria for the actual handoff could include a hard handoff threshold, where an upper limit round trip delay threshold is reached and wireless communication device 110 is forced by wireless access system 120 to engage in a handoff away from the present sector. The hard handoff threshold could be determined by a wireless protocol delay limit, or upon other factors such as past handoff metrics.

Figure 3:
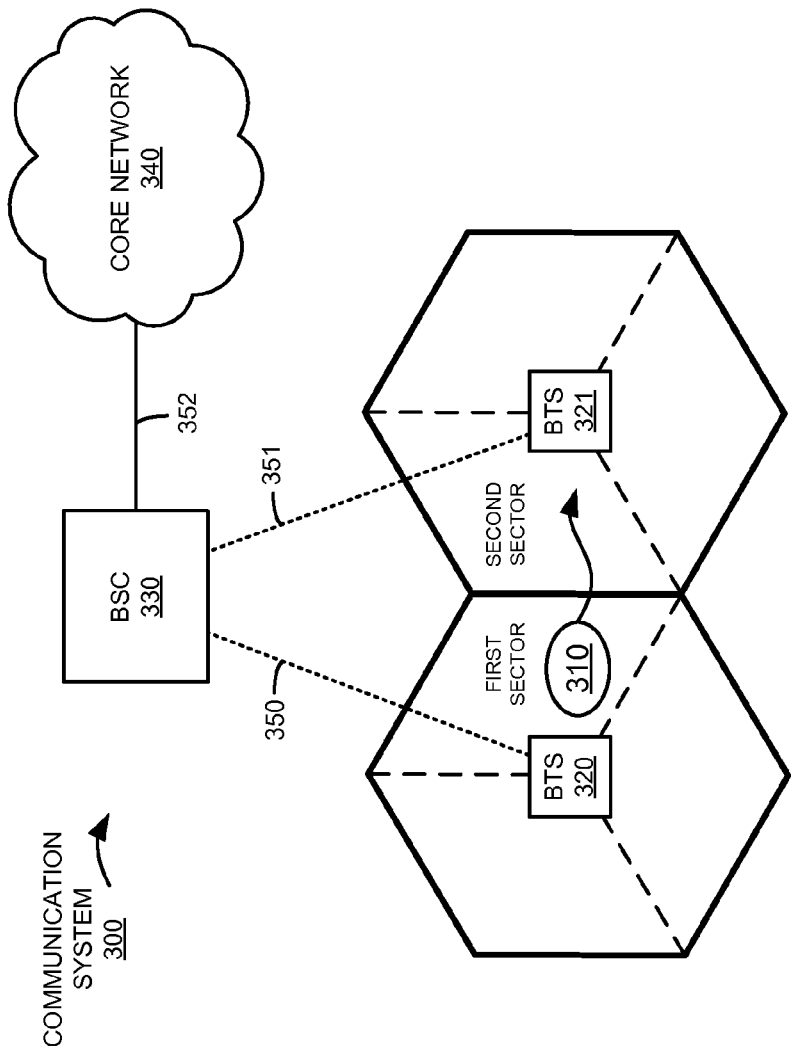
FIG. 3 is a system diagram illustrating a communication system.

FIG. 3 is a system diagram illustrating communication system 300. Communication system 300 includes wireless communication device (WCD) 310, base transceiver stations (BTS) 320-321, base station controller (BSC) 330, and core network 340. WCD 310 initially receives wireless access from the first sector, and moves into the region of the second sector in this example. Wireless links used by WCD 310 for communication with the various sectors of FIG. 3 are not shown for clarity. BTS 320-321 communicate with BSC 330 over backhaul links 350-351, respectively. In this example, links 350-351 are each T1 links. BSC 330 and core network 340 communicate over link 352. In this example, link 352 is an optical communication link.

WCD 310 is a mobile wireless smartphone in this example. BTS 320-321 each includes wireless communications equipment capable of communicating with and providing communication service to wireless communication devices, such as transceivers, processing systems, and antenna systems. Core network 340 is a core network of a wireless communication provider in this example. Core network 340 could include further base transceiver stations, routers, gateways, controller systems, processing systems, or other communication equipment. BSC 330 includes equipment such as communication interfaces and processing systems for communicating with and controlling BTS 320-321. BSC 340 could also include communication equipment capable of routing communications between BTS 320-321 and core network 330. In this example, BTS 320-321 are operated by the same service provider as BSC 330.

As shown in FIG. 3, BTS 320-321 each have a limited geographic range over which they can provide communication services to wireless communication devices. The limited range over which each BTS 320-321 can support communications with wireless communication devices is indicated by hexagonal-shaped coverage areas in FIG. 3. Although a hexagonal region defining each coverage area is shown in FIG. 3, it should be understood that the coverage areas could be of other shapes and configurations, as determined by geographic features, empirical data, the equipment of BTS 320-321, or by other factors, including combinations thereof. Also in the example shown in FIG. 3, each hexagonal coverage area of BTS 320-321 is further divided into three sectors each. A sector can represent a particular region of wireless coverage, typically served by a single antenna, antenna array, or base transceiver station of an access node. Further base transceiver station equipment could be included in BTS 320-321 in examples where sectors are employed. In many examples, there are multiple sectors associated with a single wireless access node, antenna tower, or base station, with each sector describing a slice of the surrounding geographic region serviced by a BTS.

Figure 4:
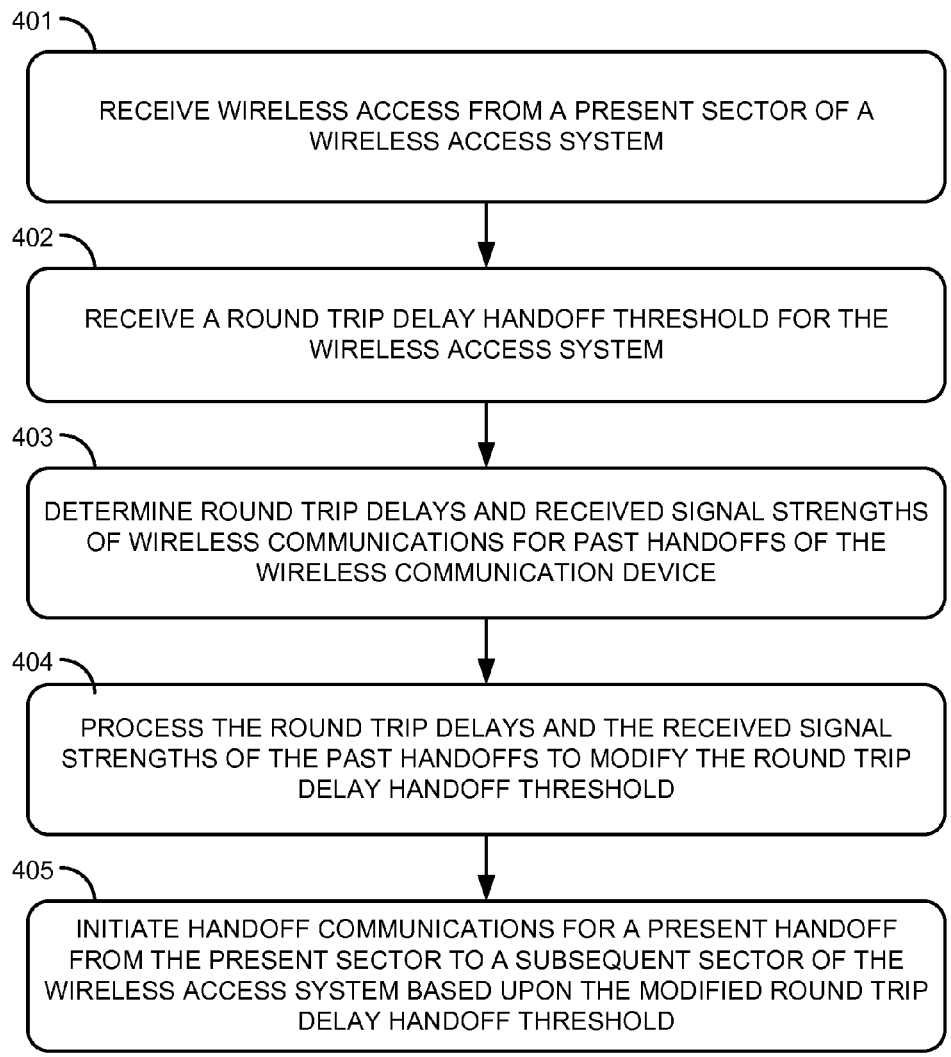
FIG. 4 is a flow diagram illustrating a method of operation of a wireless communication device.

FIG. 4 is a flow diagram illustrating a method of operation of wireless communication device (WCD) 310. The operations of FIG. 4 are referenced herein parenthetically. In FIG. 4, wireless communication device 310 receives (401) wireless access from a present sector of a wireless access system. In this example, the present sector is "first sector" as shown in FIG. 3, and the wireless access system includes BTS 320 and associated equipment, such as BSC 330. The wireless access could include receiving wireless access to user communication services such as voice calls, messaging, Internet access, video streaming, or other communication services through BTS 320, BSC 330, or core network 340.

Wireless communication device 310 receives (402) a round trip delay handoff threshold for the wireless access system. In this example, the round trip delay handoff threshold is for all BTS equipment and sectors controlled by BSC 330, such as BTS 320-321. In other examples, the round trip delay handoff threshold could be for an individual BTS or sector. The round trip delay handoff threshold establishes a threshold for wireless communication device 310 to begin the process of transitioning to another sector or BTS to ensure further wireless access. For example, as wireless communication device 310 moves through the coverage area of BTS 320, as indicated by the arrow path in FIG. 3, wireless communication device 310 can become distant from the wireless access equipment of the present sector. The delay of communications exchanged with BTS 320 can increase as the distance away from BTS 320 increases, leading to increased communication latency, larger round trip delays, and decreased received signal strengths. As the round trip delay of communications with BTS 320 increases, the round trip delay handoff threshold may be exceeded, which can trigger handoff communications for a possible handoff to another sector. However, as described herein, the received round trip delay handoff threshold is first processed along with past handoff metrics to determine a modified round trip delay handoff threshold or multiple thresholds.

Multiple thresholds could be employed, such as a first minimum round trip delay handoff threshold which initiates handoff communications and a second maximum round trip delay handoff threshold which initiates the actual handoff. In other examples, a signal strength threshold could be employed. Combinations of round trip delay thresholds and signal strength thresholds could also be employed, such as where a round trip delay handoff threshold indicates when to initiate handoff communications or handoff messaging, and a signal strength threshold indicates when to initiate the actual handoff. In some examples, the signal strength threshold initiates the handoff after a first round trip delay threshold has already been crossed and associated handoff communications have been exchanged, but before a second round trip delay handoff threshold is reached, where the second round trip delay handoff would force a hard handoff of wireless communication device 310.

Wireless communication device 310 determines (403) round trip delays and received signal strengths of wireless communications for past handoffs of wireless communication device 310. Metrics, such as round trip delays and received signal strengths of past handoffs, are determined in this example. The metrics represent past behavior as measured by wireless communication device 310, and are typically stored by wireless communication device 310. In further examples, wireless communication device 310 could receive metrics from other systems, such as from BSC 330 or equipment in core network 340. For example, during a previous handoff, metrics including a round trip delay for communications with a present sector and a signal strength of communications as received from the BTS of the present sector are determined by wireless communication device 310. The metrics are stored by wireless communication device 310 for later processing. Handoff metric measurements for many previous handoffs could be stored by wireless communication device 310.

Wireless communication device 310 processes (404) the round trip delays and the received signal strengths of the past handoffs to modify the round trip delay handoff threshold. In some examples, the round trip delays and the received signal strengths of the past handoffs could be processed to determine a historical pattern of past handoffs, such as a clustering, minimum, maximum, or average of the metrics for past handoffs. The pattern of the metrics for past handoffs is then processed to determine the modified round trip delay threshold. As a further example, the received round trip delay threshold may indicate a first threshold, and—based on past metrics—wireless communication device 310 determines that the threshold indicates too small of a round trip delay to initiate handoff communications, leading to more frequent handoff messaging. Wireless communication device 310 could process the round trip delays and received signal strengths of actual past handoffs to determine a different threshold value. This different threshold value could indicate a larger round trip delay or lower received signal strength, including combinations thereof, which must be experienced by wireless communication device 310 before handoff communications are initiated. Advantageously, this can lead to decreased handoff messaging and traffic congestion in the wireless access system, as well as less interruptions due to handoff communications for user communications on wireless communication device 310.

In some examples, the metrics are determined on a per-sector basis, where only metrics for a first sector are processed when modifying the round trip delay threshold for that same first sector. In further examples, the metrics are determined across all sectors of a wireless access system, or a portion thereof. Multiple thresholds could be employed, such as a first handoff threshold which initiates handoff communications and a second handoff threshold to proceed with the actual handoff. In other examples, a signal strength threshold could be employed. Combinations of round trip delay thresholds and signal strength thresholds could also be employed, such as where a round trip delay handoff threshold indicates when to initiate handoff communications or handoff messaging, and a signal strength threshold indicates when to initiate the actual handoff. However, as described herein, the received round trip delay handoff threshold is first processed along with past handoff metrics to determine a modified round trip delay handoff threshold. In many examples, the received round trip delay handoff threshold could be a default value for the wireless access system, and wireless communication device 310 modifies this default value according to past metrics within the wireless access system.

In further examples, determining the modified round trip delay threshold includes increasing the received round trip delay threshold based upon a minimum round trip delay of the round trip delay metrics for the past handoffs. In yet further examples, determining the modified round trip delay threshold includes modifying the received round trip delay threshold based upon a maximum round trip delay of the round trip delay metrics for the past handoffs. In other examples, determining the modified round trip delay threshold includes increasing the received round trip delay threshold based upon a minimum round trip delay and a minimum signal strength of the round trip delay metrics for the past handoffs. In another example, wireless communication device 310 receives a signal strength handoff threshold for the wireless access system, and wireless communication device 310 processes the round trip delays and the received signal strengths of the past handoffs to modify the signal strength handoff threshold. The modified signal strength handoff threshold could be used to proceed with a handoff of wireless communication device 310.

Wireless communication device 310 initiates (405) handoff communications for a present handoff from the present sector to a subsequent sector of the wireless access system based upon the modified round trip delay handoff threshold. As shown in FIG. 3, the present sector is "first sector" and the subsequent sector is "second sector." The handoff communications typically include communications or messaging related to the setup of a potential handoff of wireless communication device 310 from a present sector to another sector. In further examples, if wireless communication device 310 meets further criteria for an actual handoff, then wireless communication device 310 would proceed with a handoff and transition from receiving wireless access in the present sector to receiving wireless access in a subsequent sector. The handoff communications can include information on which other sectors are available for handoff of wireless communication device 310, signal strength information for the other sectors, service request information, channel assignments, routing information, or other information, to aid wireless communication device 310 and the other sectors involved with the handoff. The other sectors available for handoff could be included in an active set, neighbor list, or other list of wireless communication device 310, or provided to wireless communication device 310.

Wireless communication device 310 could employ a handoff threshold, which could be based upon different factors, and indicate when an actual handoff would follow the associated handoff communications. For example, a signal strength threshold could indicate when to perform a handoff. In another example, an additional round trip delay threshold is employed to indicate when to perform a handoff. However, in some examples, wireless communication device 310 does not initiate an actual handoff after the handoff communications are initiated, perhaps due to increases in received signal strength or decreases in round trip delay, such as from movement back closer to the wireless equipment of the present sector, changing RF conditions, or other factors.

Figure 5:
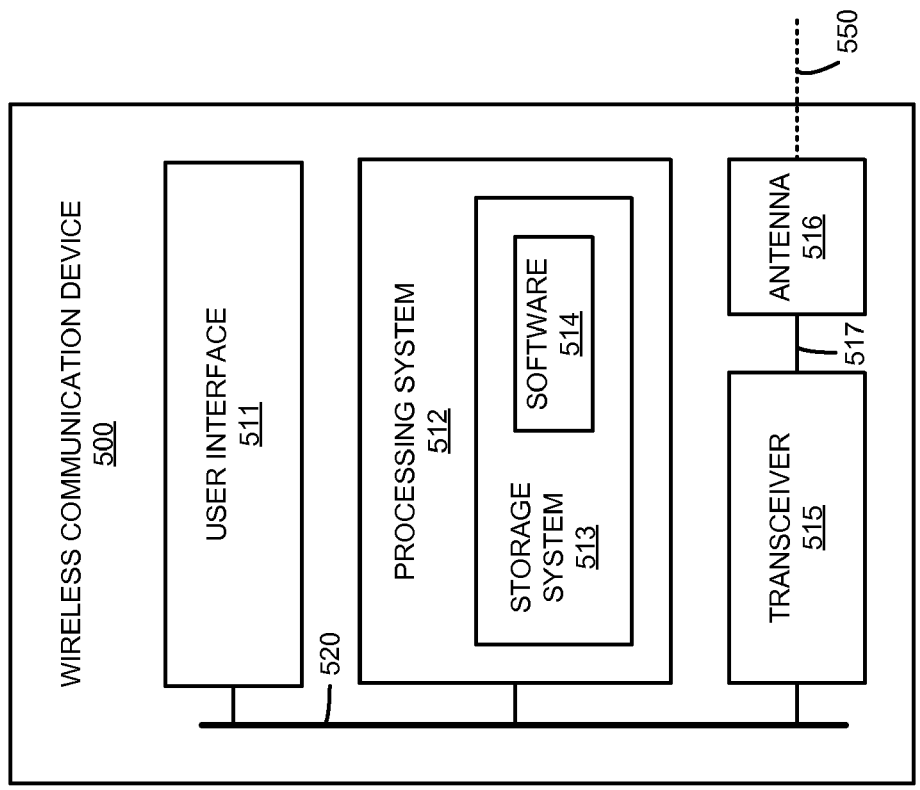
FIG. 5 is a block diagram illustrating a wireless communication device.

FIG. 5 is a block diagram illustrating wireless communication device 500, as an example of wireless communication device 110 found in FIG. 1 or wireless communication device 310 found in FIG. 3, although wireless communication devices 110 and 310 could use other configurations. Wireless communication device 500 includes user interface 510, processing system 512, transceiver 515, and antenna 516. User interface 510, processing system 512, and transceiver 515 communicate over bus 520. Transceiver 515 and antenna 516 communicate over link 517. Wireless communication device 500 may be distributed or consolidated among devices that together form elements 510-517 and 520.

User interface 510 includes equipment and circuitry for receiving user input and control. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 510 also includes equipment to communicate information to a user of wireless communication device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Processing system 512 includes storage system 513. Processing system 512 retrieves and executes software 514 from storage system 513. Processing system 512 could incorporate a computer microprocessor, logic circuit, or some other processing device, and may be distributed among multiple processing devices. Storage system 513 could include computer-readable media such as disks, tapes, integrated circuits, servers, or some other memory device, and also may be distributed among multiple memory devices. Software 514 may include an operating system, logs, utilities, drivers, networking software, and other software typically loaded onto a computer system. Software 514 could contain an application program, firmware, or some other form of computer-readable processing instructions. When executed by processing system 512, software 514 directs wireless communication device 500 to operate as described herein to at least receive wireless access from a sector of a wireless access system, determine round trip delays and received signal strengths of wireless communications for past handoffs, process the round trip delays and received signal strengths to modify a present round trip delay threshold, initiate handoff communications, and perform handoffs, among other operations.

Transceiver 515 comprises radio frequency (RF) communication circuitry. Transceiver 515 could also include amplifiers, filters, modulators, and signal processing circuitry. In this example, transceiver 515 can exchange instructions and information with processing system 512 over bus 520. Transceiver 515 also communicates with wireless access systems, such as base stations, omitted for clarity, through antenna 516 over wireless link 550, to access communication services and exchange communications of the communication services, receive round trip delay handoff thresholds, and exchange handoff communications, among other operations.

Antenna 516 includes an antenna or antenna array, and could include additional circuitry such as impedance matching elements, physical structures, wires, or other elements. Antenna 516 can exchange RF communications with transceiver 515 and may include multiplexing circuitry. Antenna 516 allows for communication of wireless communication device 500 over wireless link 550. In many examples, the circuitry of transceiver 515 also includes the elements of antenna 516.

Wireless link 550 could use various protocols or communication formats as described herein for wireless links 140-141, including combinations, variations, or improvements thereof. Link 517 comprises a wireline RF link in this example. Link 517 exchanges RF energy and communications between antenna 516 and transceiver 515. Link 517 could also include wires, waveguides, inductive coupling elements, near-field coupling elements, buffers, impedance matching elements, among other elements.

Bus 520 comprises a physical, logical, or virtual communication link, capable of communicating data, control signals, communications, and power, along with other information and signals. In some examples, bus 520 is encapsulated within any of elements 510-515, and may be a software or logical link. In other examples, bus 520 uses various communication media, such as air, space, metal, optical fiber, or some other signal propagation path, including combinations thereof. Bus 520 could be a direct link or might include various equipment, intermediate components, systems, and networks.

Figure 6:
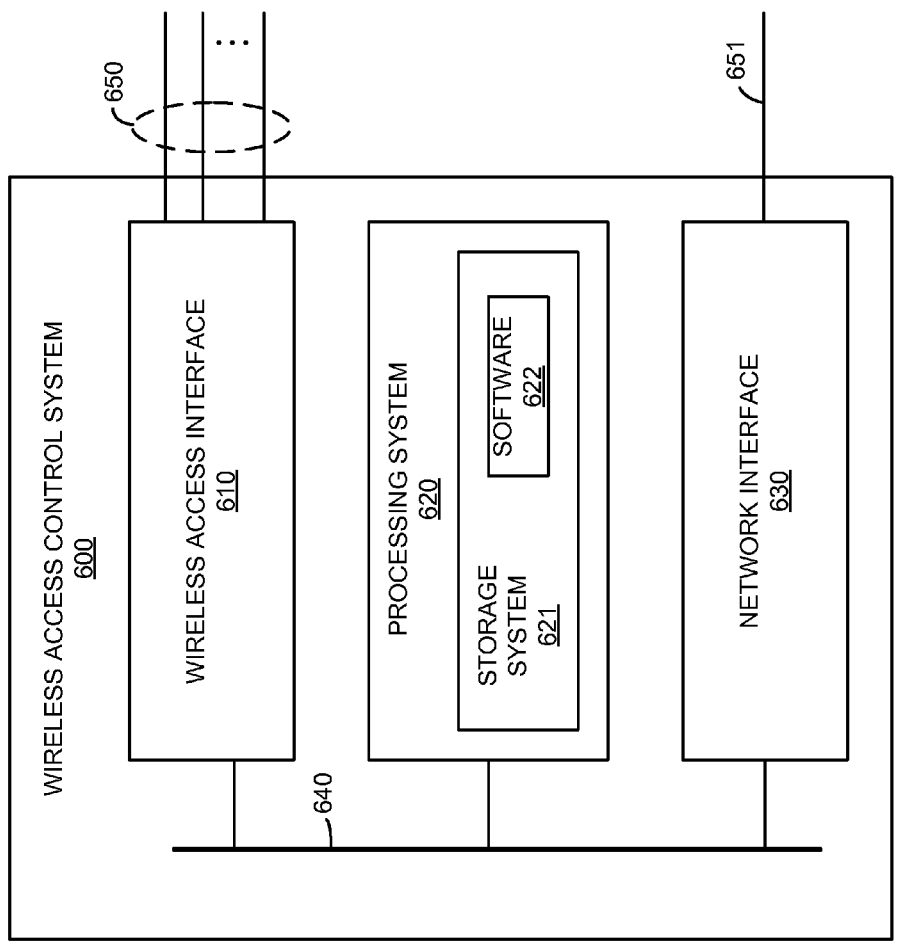
FIG. 6 is a block diagram illustrating a wireless access control system.

FIG. 6 is a block diagram illustrating wireless access control system 600, as an example of wireless access system 120 found in FIG. 1 or base station controller 330 found in FIG. 3, although wireless access control 120 or base station controller 330 could use other configurations. Wireless access control system 600 includes wireless interface 610, processing system 620, and network interface 630. Wireless access interface 610, processing system 620, and network interface 630 communicate over bus 640. Wireless access control system 600 may be distributed among multiple devices that together form elements 610, 620-622, 630, 640, and 650-651.

Wireless access interface 610 comprises communication interfaces for communicating with and controlling the operations of base stations over links 650. Wireless access interface 610 also receives command and control information and instructions from processing system 620 or network interface 630 for controlling the operations of base stations over links 650, as well as for exchanging handoff communications of wireless communication devices between other wireless access nodes or base stations. Links 650 could each use various protocols or communication formats as described herein for wireless links 140-141 or backhaul links 350-351, including combinations, variations, or improvements thereof.

Processing system 620 includes storage system 621. Processing system 620 retrieves and executes software 622 from storage system 621. In some examples, processing system 620 is located within the same equipment in which wireless access interface 610 or network interface 630 are located. In further examples, processing system 620 comprises specialized circuitry, and software 622 or storage system 621 could be included in the specialized circuitry to operate processing system 620 as described herein. Storage system 621 could include a computer-readable medium such as a disk, tape, integrated circuit, server, or some other memory device, and also may be distributed among multiple memory devices. Software 622 may include an operating system, logs, utilities, drivers, networking software, and other software typically loaded onto a computer system. Software 622 could contain an application program, firmware, or some other form of computer-readable processing instructions. When executed by processing system 620, software 622 directs processing system 620 to operate as described herein to at least provide wireless access in sectors of a wireless access system, determine round trip delays and signal strengths of wireless communications for past handoffs of wireless communication devices, process the round trip delays and signal strengths to modify a round trip delay threshold, exchange handoff communications, and perform handoffs, among other operations.

Network interface 630 comprises network router and gateway equipment for communicating with a core network of a wireless communication provider, such as with core network 130 or core network 340. Network interface 630 exchanges user communications and overhead communications with a core network of a wireless communication system over link 651. Link 651 could use various protocols or communication formats as described herein for links 142 or 352, including combinations, variations, or improvements thereof.

Bus 640 comprises a physical, logical, or virtual communication link, capable of communicating data, control signals, power, and communications, along with other information. In some examples, bus 640 is encapsulated within the elements of wireless access interface 610, processing system 620, or network interface 630, and may be a software or logical link. In other examples, bus 640 uses various communication media, such as air, space, metal, optical fiber, or some other signal propagation path, including combinations thereof. Bus 640 could be a direct link or might include various equipment, intermediate components, systems, and networks.

Referring back to FIG. 1, wireless communication device 110 comprises radio frequency (RF) communication circuitry and antenna elements. The RF communication circuitry typically includes amplifiers, filters, modulators, and signal processing circuitry. In many examples, wireless communication device 110 includes circuitry and equipment to exchange communications of multiple wireless communication services over multiple wireless links, or with multiple base stations. Wireless communication device 110 may also include user interface systems, memory devices, computer-readable storage mediums, software, processing circuitry, or other communication components. Wireless communication device 110 may be a user device, subscriber equipment, customer equipment, access terminal, telephone, mobile wireless telephone, computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be shown.

Wireless access system 120 comprises RF communication and control circuitry, antenna elements, and communication routing equipment and systems. The RF communication circuitry typically includes amplifiers, filters, RF modulators, transceivers, and signal processing circuitry. In many examples, wireless access system 120 includes equipment to provide wireless access and communication services within different sectors to user devices, such as wireless communication device 110 shown in FIG. 1, as well as route user communications between core network 130 and wireless communication device 110, or provide network information or handoff information to wireless communication device 110. Wireless access system 120 may also comprise data modems, routers, servers, memory devices, software, processing systems, cabling, network communication interfaces, physical structural supports, or other communication apparatuses. Wireless access system 120 may also comprise base stations, base transceiver stations (BTS), base station controllers (BSC), mobile switching centers (MSC), radio node controllers (RNC), or other communication equipment and apparatuses.

Core network 130 could include further wireless access systems, or could include base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Core network 130 may also comprise optical networks, asynchronous transfer mode (ATM) networks, packet networks, metropolitan-area networks (MAN), or other network topologies, equipment, or systems, including combinations thereof. In typical examples, core network 130 includes many wireless access systems and associated equipment for providing communication services to many user devices across a geographic region.

Wireless links 140-141 each use the air or space as the transport media. Wireless links 140-141 may each use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), Radio Link Protocol (RLP), or some other wireless communication format, including combinations, improvements, or variations thereof. Although two wireless links 140-141 are shown in FIG. 1, it should be understood that these separate wireless links are merely illustrative to show handoff communications with two sectors for wireless communication device 110.

Communication link 142 uses metal, glass, optical, air, space, or some other material as the transport media. Communication link 142 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication link 142 could be a direct links or may include intermediate networks, systems, or devices.

Links 140-142 may each include many different signals sharing the same link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions. In many examples, the portion of wireless links 140-141 as transmitted by wireless communication device 110 is referred to an uplink or reverse link of the wireless link, while the portion as transmitted by wireless access system 120 is referred to as a downlink or forward link of the wireless link.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system comprising:
   determining a first round trip delay threshold to initiate handoff messaging;
   determining round trip delay metrics comprising round trip delays for a plurality of handoffs in a wireless access sector;
   processing the first round trip delay threshold and the round trip delay metrics for the wireless access sector to determine a second round trip delay threshold by increasing the first round trip delay threshold based upon a minimum round trip delay of the round trip delay metrics for the plurality of handoffs in the wireless access sector;
   wirelessly transferring the second round trip delay threshold to a wireless communication device in the wireless access sector, wherein the wireless communication device uses the second round trip delay threshold to initiate handoff messaging in the wireless access sector.

2. The method of claim 1, wherein the round trip delay metrics comprise round trip delays and reported signal strengths of wireless communications for past handoffs of a plurality of wireless communication devices which received wireless access from the wireless communication system.

3. The method of claim 1, wherein the wireless communication device initiates the handoff messaging in the wireless access sector by monitoring a present round trip delay of present communications of the wireless communication device and initiating the handoff messaging when the present round trip delay exceeds the second round trip delay threshold.

4. The method of claim 3, wherein the wireless communication device initiates a handoff from the wireless access sector to another wireless access sector based on the handoff messaging when a signal strength of the present communications falls below a signal strength threshold.

5. The method of claim 1, wherein determining the second round trip delay threshold comprises increasing the first round trip delay threshold based upon a minimum round trip delay of the round trip delay metrics for the plurality of handoffs in the wireless access sector.

6. The method of claim 1, wherein the round trip delay metrics comprise reported signal strengths of wireless communications for past handoffs of a plurality of wireless communication devices which received wireless access from the wireless communication system; and
   wherein determining the second round trip delay threshold comprises increasing the first round trip delay threshold based upon the minimum round trip delay and a minimum signal strength of the round trip delay metrics for the plurality of handoffs in the wireless access sector.

7. A method of operating a wireless communication device, the method comprising:
   receiving wireless access from a present sector of a wireless access system;
   receiving a round trip delay handoff threshold for the wireless access system;
   determining round trip delays and received signal strengths of wireless communications for past handoffs of the wireless communication device;
   processing the round trip delays and the received signal strengths of the past handoffs to modify the round trip delay handoff threshold by increasing the round trip delay handoff threshold based upon at least a minimum round trip delay of the round trip delays; and
   initiating handoff communications for a present handoff from the present sector to a second sector of the wireless access system based upon the modified round trip delay handoff threshold.

8. The method of claim 7, wherein the handoff communications for the present handoff from the present sector to the second sector comprises handoff setup communications.

9. The method of claim 7, wherein initiating the handoff communications based upon the modified round trip delay handoff threshold comprises monitoring a present round trip delay of present communications of the wireless communication device and initiating the handoff communications when the present round trip delay exceeds the modified round trip delay handoff threshold.

10. The method of claim 9, further comprising:
initiating the present handoff from the present sector to the second sector when a received signal strength of the present communications falls below a signal strength threshold.

11. The method of claim 7, further comprising:
receiving a signal strength handoff threshold for the wireless access system;
processing the round trip delays and the received signal strengths of the past handoffs to modify the signal strength handoff threshold; and
initiating the present handoff from the present sector to the second sector based upon the modified signal strength handoff threshold.

12. The method of claim 7, wherein increasing the round trip delay handoff threshold based upon the round trip delays and the received signal strengths of the past handoffs comprises determining a minimum round trip delay and a minimum signal strength for the past handoffs and modifying the round trip delay handoff threshold based upon the minimum round trip delay and the minimum signal strength among the past handoffs.

13. A wireless communication device, wherein the wireless communication device is receiving wireless access from a present sector of a wireless access system, comprising:
a transceiver configured to receive a round trip delay handoff threshold for the wireless access system;
a processing system configured to determine round trip delays and received signal strengths of wireless communications for past handoffs of the wireless communication device and process the round trip delays and the received signal strengths of the past handoffs to modify the round trip delay handoff threshold by increasing the round trip delay handoff threshold based upon at least a minimum round trip delay of the round trip delays; and
the processing system configured to initiate handoff communications for a present handoff from the present sector to a second sector of the wireless access system based upon the modified round trip delay handoff threshold.

14. The wireless communication device of claim 13, wherein the handoff communications for the present handoff from the present sector to the second sector comprises handoff setup communications.

15. The wireless communication device of claim 13, comprising:
the processing system configured to monitor a present round trip delay of present communications of the wireless communication device and initiate the handoff communications when the present round trip delay exceeds the modified round trip delay handoff threshold.

16. The wireless communication device of claim 15, comprising:
the processing system configured to initiate the present handoff from the present sector to the second sector when a received signal strength of the present communications falls below a signal strength threshold.

17. The wireless communication device of claim 13, comprising:
the transceiver configured to receive a signal strength handoff threshold for the wireless access system;
the processing system configured to process the round trip delays and the received signal strengths of the past handoffs to modify the signal strength handoff threshold; and
the processing system configured to initiate the present handoff from the present sector to the second sector based upon the modified signal strength handoff threshold.

18. The wireless communication device of claim 13, comprising:
the processing system configured to determine a minimum round trip delay for the past handoffs.

19. The wireless communication device of claim 13, comprising:
the processing system configured to determine a minimum round trip delay and a minimum signal strength for the past handoffs and modify the round trip delay handoff threshold based upon the minimum round trip delay and the minimum signal strength among the past handoffs.

* * * * *